Nov. 10, 1925.

J. A. SPENCER

ELECTRIC HEATER

Original Filed April 8, 1921

1,561,437

John A. Spencer,
Inventor,
Delos G. Haynes,
Attorney

Patented Nov. 10, 1925.

1,561,437

UNITED STATES PATENT OFFICE.

JOHN A. SPENCER, OF REVERE, MASSACHUSETTS, ASSIGNOR TO SPENCER THERMOSTAT COMPANY, OF CAMBRIDGE, MASSACHUSETTS, A CORPORATION OF MASSACHUSETTS.

ELECTRIC HEATER.

Original application filed April 8, 1921, Serial No. 459,773. Divided and this application filed March 12, 1923. Serial No. 624,597.

*To all whom it may concern:*

Be it known that I, JOHN A. SPENCER, a citizen of the United States, and a resident of Revere, Massachusetts, have invented an Improvement in Electric Heaters, of which the following is a specification.

The present invention relates to temperature controlled electric heating apparatus. This application is a division of my application Serial No. 459,773 filed April 8, 1921, patented March 13, 1923, Patent No. 1,448,240.

Thermostatic controls for electric heating apparatus consisting of two dissimilar metals having different coefficients of thermal expansion have long been used. These controls have certain very decided objections, however, primarily due to the fact that the change of state takes place slowly in accordance with the change in temperature.

The object of the present invention is to provide an improved type of thermostatically controlled electric heating apparatus which overcomes the objections inherent in prior apparatus.

With this object in view one feature of the invention contemplates the provision of an electrically heated apparatus having in a heated portion thereof a thermostatic device to which is imparted a sudden and rapid movement when a substantially predetermined temperature is reached.

In the simplest and most efficient form of the thermostatic element which has yet been devised a relatively thin sheet consisting of two metals having different thermal coefficients of expansion is formed into a non-developable sheet. When this device is heated to a certain point the sheet is suddenly caused to curve in a direction opposite to that in which it is initially curved, remaining in this condition until the temperature is substantially lowered. Upon reaching a predetermined lower limit of temperature, the sheet is suddenly curved in the opposite direction. The action of this device may be compared to the principle of a toggle lever having a spring which normally holds it in an inclined or broken position.

In the present case the unequal expansion or contraction of the metals forming the disk provides force for reversing the curvature of the non-developable sheet.

Figure 1:
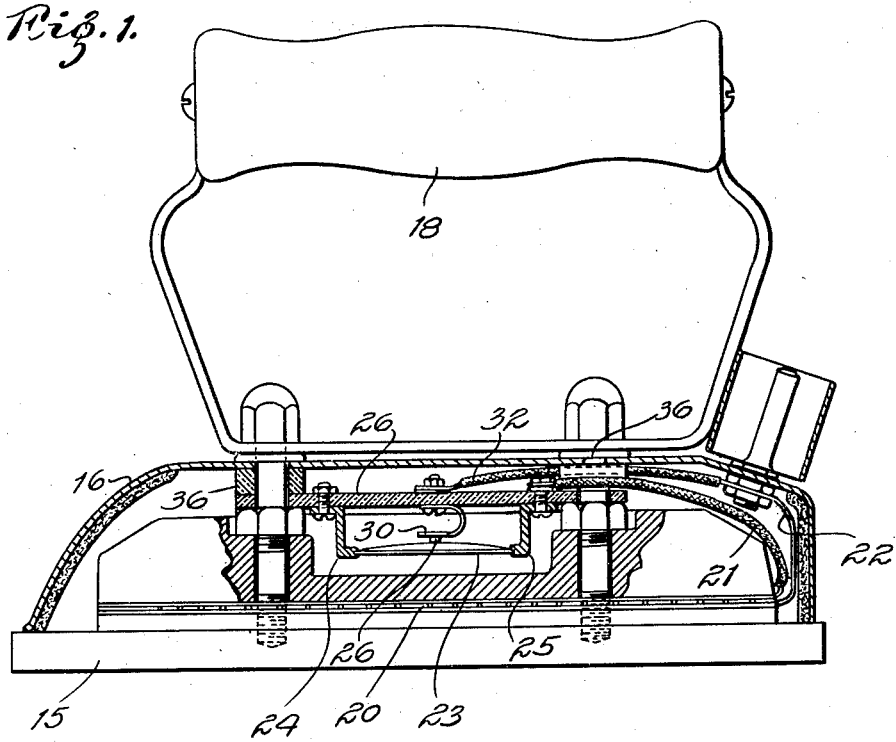
Figure 2:
Figure 3:
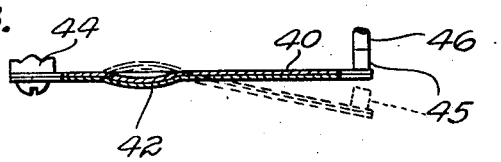

In the accompanying drawings illustrating the preferred form of the invention Fig. 1 represents the invention embodied in an electric flatiron and used for controlling the flow of current to the iron; Fig. 2 represents the new thermostatic device developed upon the surface of a sphere and Fig. 3 illustrates a somewhat different form of control.

The illustrated embodiment of the invention is shown particularly in connection with the thermostatic control of electric flat irons in which connection the present invention has particular utility, owing to the quick breaking of the heating circuit which results from the sudden reversal of shape of the thermostatic sheet. Referring to the accompanying drawings the thermostatic control is indicated in Fig. 2 as a composite sheet made up of two materials, in this instance, two metals such as iron and brass, having different thermal coefficients of expansion so that a change in temperature will cause unequal expansion and contraction of opposite faces of the sheet. This sheet is shaped into a cupped portion or non-developable surface, as, for example, by forming a spherical projection 10 in a flat sheet 11. If a thermostatic sheet is thus shaped and constructed it will be found that upon raising the temperature the unequal expansion of the materials forming the sheet will cause a tendency to flatten the cupped surface until at a predetermined temperature a sudden curving of the non-developable surface into the opposite direction occurs, which reversal of shape or flexure will be maintained until the temperature has been substantially lowered. Thereafter upon reaching a substantially predetermined temperature the sheet will suddenly return to its initial shape. In both of these movements the reversal of curvature is exceedingly abrupt and is caused by the expansion and contraction of the materials of which the thermostatic sheet is composed. Free expansion and contraction of the inner portion of the dent or curve of the sheet is opposed or prevented by the material surrounding said portion. Upon rise of temperature the expansion of the materials of the inner portion causes stresses to be set up in the materials. When these stresses are sufficient to cause the device to reach a condition of instability (this condition is reached at a predetermined temperature) the ensuing sudden liberation of the stored stresses effects a sudden movement of said portion, the movement occurring automatically.

The action of the non-developable sheet is sudden and positive and the reversal of shape occurs with considerable force, depending upon the thickness of the sheet and the area of the surface which undergoes the change. For example, the illustrated embodiment is shown as applied to an electric flatiron comprising a base plate or presser member 15, a shell 16 and a handle 18. The flatiron is heated by a heating element such as the usual coil 20 connected into an electric circuit through leads 21 and 22. The thermostatic control is inserted in one side of the circuit, as shown, and may consist of a curved sheet 23 of two dissimilar metals retained at its opposite edges in brackets 24 and 25 secured to a base 26 of insulating material. The curved control member 23 is provided with a contact 28 which cooperates with a stationary contact 30 secured to the base member and connected with a lead 32. The base member and elements carried thereby may be conveniently insulated from the iron in any suitable manner as by insulator bushings or sleeves 36. With such a construction the flow of current to the heater resistance is automatically cut off when an excessive temperature limit is reached, the curved sheet 23 at this point suddenly breaking the circuit through the two contacts 28 and 30. When the temperature of the thermostatic sheet has been reduced (that is, changed in opposite sense or direction) to a predetermined point it will return to its initial position and close the circuit. It will be obvious that with such a construction a positive and effective mechanism is provided for preventing overheating of the electric iron with the consequent disastrous results. Furthermore the control will operate indefinitely without deterioration as the sudden breaking of the circuit prevents any substantial arcing between the contact points. Fig. 3 illustrates a somewhat different form of thermostatic control, enabling a somewhat greater separation of the contacts to be obtained. In this construction an arm 40 is formed of two dissimilar metals and is provided with a broken curve at 42 to form a non-developable surface. This arm is supported at 44 and the opposite free end carries a contact member 45 which may be adapted to cooperate with a stationary contact 46. If the temperature of this arm be then raised it will be obvious that a curving of the surface in the opposite direction at 42 will result in a substantial movement of the contact 45 away from the stationary contact 46 with a correspondingly rapid breaking of the circuit.

It should be understood that the present invention is not limited to a thermostatic member comprising any particular combination of materials having different thermal coefficients of expansion but is intended to embrace in its scope a thermostatic member comprising any combination of materials having dissimilar thermal coefficients of expansion sufficient to cause the characteristic reversal of curvature.

Furthermore, the two materials comprising the composite thermostatic sheet may be secured together in any desired manner by riveting, soldering, brazing or otherwise although it is preferred to unite the materials comprising the sheet by welding or similar means to secure a substantially indivisible sheet.

From the foregoing it will be evident that in one aspect the invention involves an electric heater having in a heated portion thereof a thermostatic device characterized by portions (the central and marginal portions of the discs in Figs. 1 and 2) arranged to react upon each other with change of temperature to set up stresses the magnitude of which changes upon change of temperature, at least one of the portions being formed of different metals or other components having different coefficients of expansion, the device reaching a condition of instability at a predetermined temperature by virtue of the arrangement of said portions and as a result of the differential expansion of the components due to change of temperature, whereupon said stresses become effective to change abruptly the relative position of said portions.

The snap action of the composite member itself is the sole actuating means or motive force for moving the movable portions of the contact device. The movable portions are moved directly from and by the movement of the composite member. In fact, in the form shown in Figure 1, the movable contact member 26 is mounted on the composite member 23.

Having described the invention, what is claimed is:

1. In an electrical heating device, the combination with relatively movable contact members mounted therein, of a snap acting composite thermostatic member mounted in a heated portion of the device and constituting the sole actuating means for effecting relative movement of the contact members, whereby the contact members are actuated relatively to interrupt quickly the circuit of the device.

2. An electric heater having a snap acting composite thermostatic member mounted in a heated portion thereof, and contact members in the heating circuit of the device, one of the contact members being mounted on the composite member.

3. In a sad iron, the combination with a base plate and a heating element, of a snap acting composite thermostatic member located in a heated portion of the iron, and relatively movable contact members in the heating circuit of the iron and directly controlled by the snap movement of the composite member whereby such movement makes and breaks such circuit.

4. In an electric heater, in combination, a heating element, a bi-metallic thermostatic member in a heated portion of the heater, contacts in the circuit of the heating element and adapted to make and break said circuit, one of said contacts being fixed with respect to the device and the other being mounted on said thermostatic member, said thermostatic member having a non-developable depression adapted to change its shape suddenly on reaching a predetermined temperature and thereby to make or break the circuit at said contacts.

5. An electric heater combining a heating element, a composite snap acting thermostatic member mounted in a heated portion of the heater, contacts in the circuit of the heating element and adapted to make and break said circuit, said contacts being mounted at the thermostatic member and in a heated portion of the heater, the thermostatic member having a non-developable portion adapted to change its shape suddenly on reaching a predetermined temperature during heating and thereby to break the circuit at said contacts, and being adapted to change its shape suddenly on reaching a predetermined temperature during cooling and thereby to make the circuit at said contacts.

In testimony whereof, I have signed my name to this specification this 10th day of March, 1923.

JOHN A. SPENCER.